United States Patent Office 2,946,426
Patented July 26, 1960

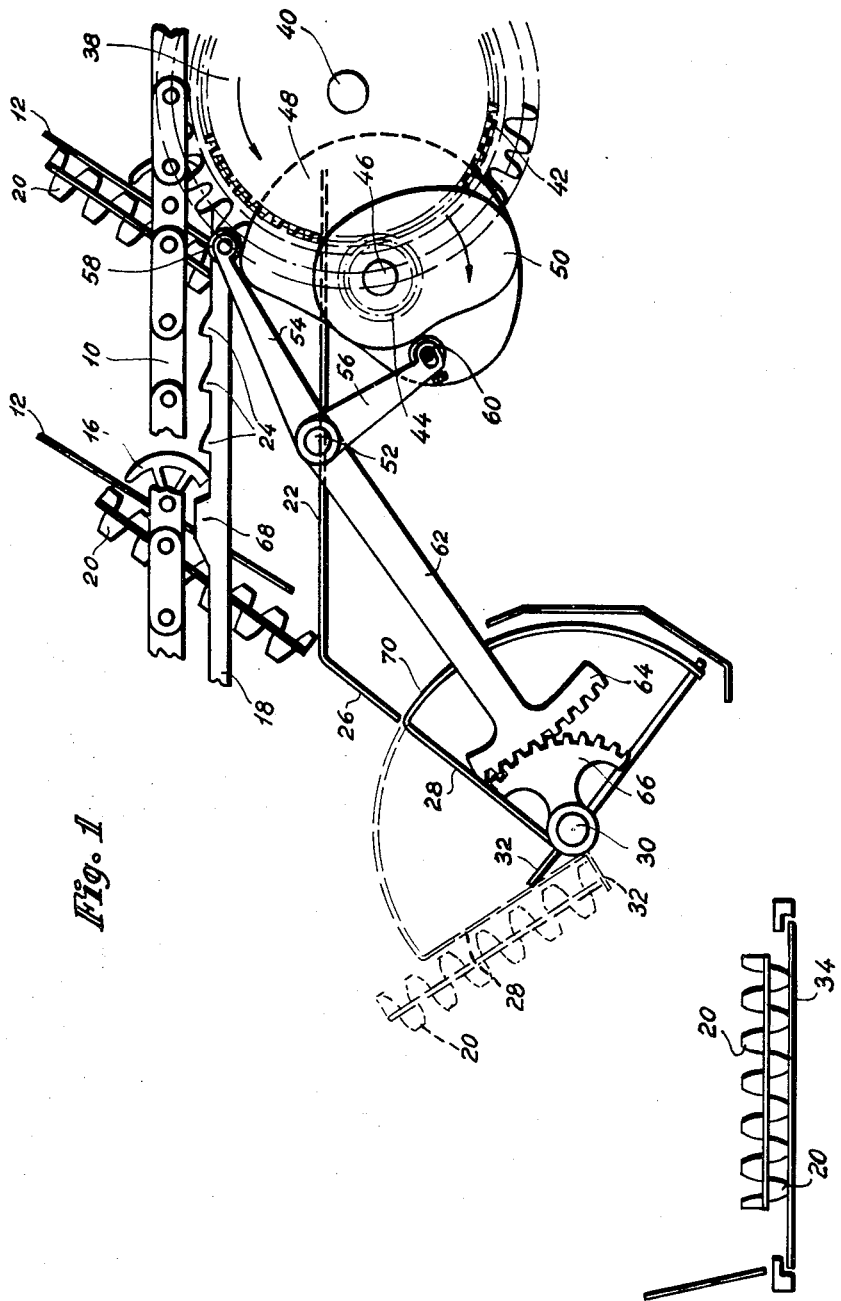

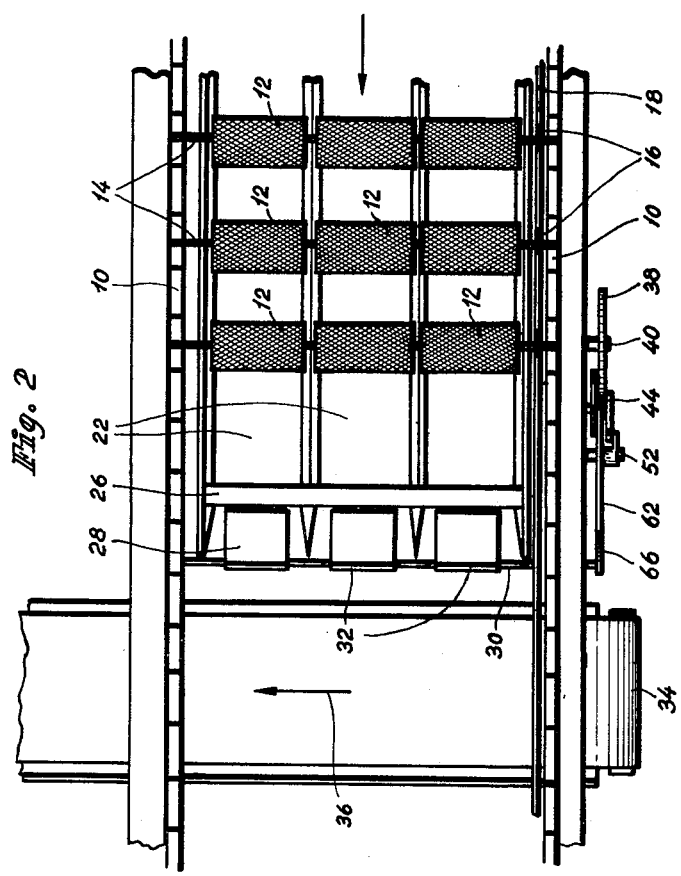

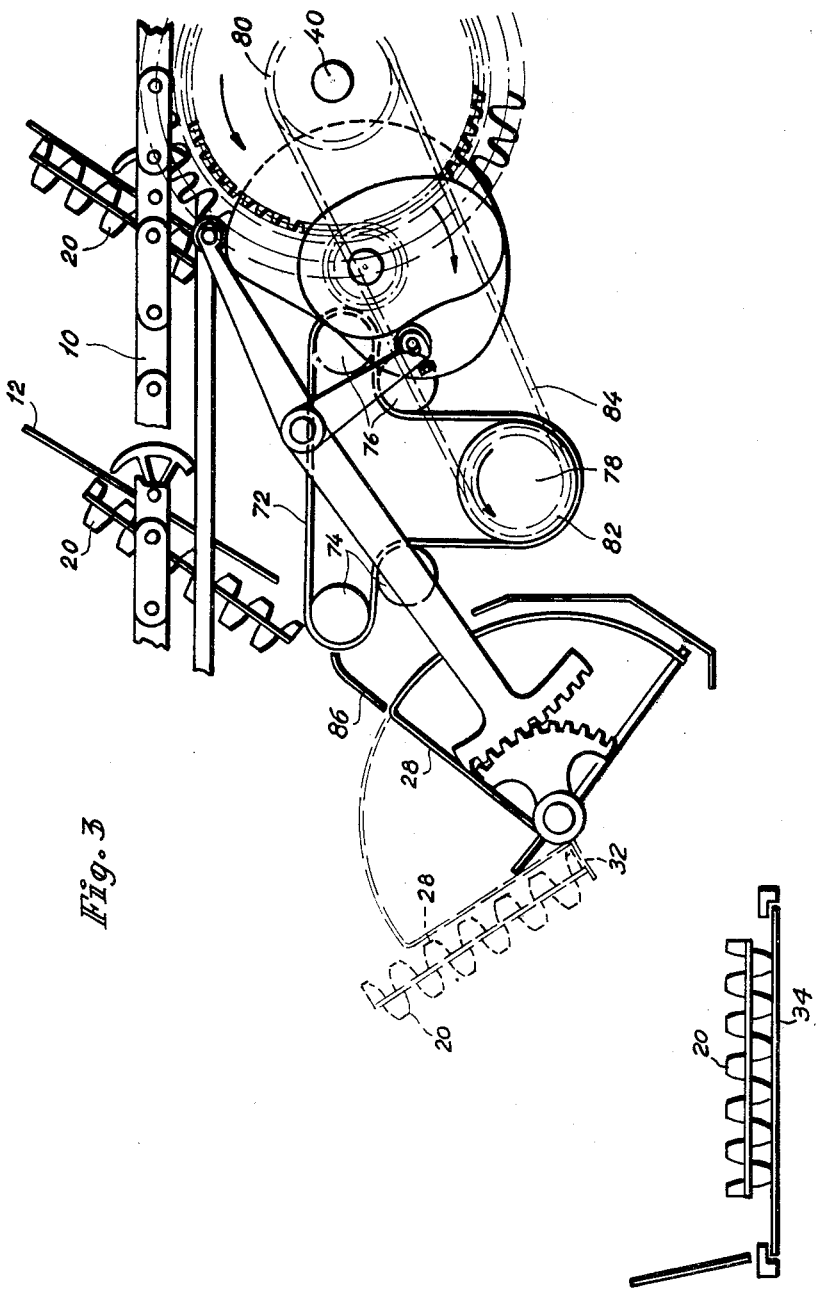

2,946,426

APPARATUS FOR CONVEYING ARTICLES

Louis Martin Hartmann and Albert Bertram Arkadius Hansen, Lyngby, Denmark, assignors to A/S Brodrene Hartmann, Lyngby, Denmark, a Danish joint-stock company Filed Sept. 16, 1958, Ser. No. 761,325

Claims priority, application Great Britain Sept. 18, 1957

12 Claims. (Cl. 198—32)

This invention relates to apparatus for conveying articles and more particularly to conveying apparatus of the kind which includes a first conveyor provided with swinging article supports which are adapted to be swung out of their normal horizontal position to effect the transfer of the article on to a second conveyor arranged at right angles to the first conveyor.

It is important that the articles should be maintained in a predetermined orientation on each conveyor, e.g. the same side uppermost and the same edge in front, and that the transfer from the first to the second conveyor should occur regularly. It is an object of the present invention to provide means for ensuring this.

According to the present invention apparatus for conveying articles of the kind which includes a first conveyor provided with swingable shelves or supports for the articles to be conveyed and a second conveyor arranged at right angles to the first conveyor and on to which said articles are adapted to be transferred by swinging the shelves, is provided with a transfer member arranged between said two conveyors, said member comprising a sloping support for receiving the articles from the shelves of the first conveyor, means being provided for rocking said sloping support into a position to discharge the articles on to the second conveyor.

According to one arrangement a rail is arranged under the delivery end of the first conveyor, so that the leading edges of the articles will ride along said rail after the shelves have been placed in a sloping position and as they move along towards the transfer position.

According to a modified arrangement an endless belt is arranged under the delivery end of the first conveyor, said belt supporting the leading edges of the articles after the shelves have been placed in sloping position. In this embodiment it is expedient that the speed of said belt is slightly higher than the advancing speed of the shelves on the conveyor.

The invention is explained in detail below with reference to the accompanying drawings, in which Fig. 1 is a side elevation of an apparatus according to one embodiment of the invention, Fig. 2 is a somewhat schematic plan view of the apparatus of Fig. 1 on a reduced scale and Fig. 3 is a side elevation of another embodiment of the invention.

The apparatus as illustrated is intended for transporting egg-trays from a kiln of a moulding machine to a stacking or packing station.

The egg-trays are adapted to be carried away from the kiln on a conveyor consisting of two laterally spaced chains 10 with shelves or supports 12 arranged therebetween, said shelves being carried by pivotally mounted shafts 14. The shelves are normally maintained in a horizontal position by counterweights 16, one being affixed to each shaft. As shown in Fig. 2 a row of three shelves 12 is carried by each shaft 14. The shelves are made of wire mesh.

Under one of the chains 10 a rail 18 is arranged (Fig. 1) against which the counter weights strike when the respective shelves 12 arrive at the position shown at the right hand side of Fig. 1. In this figure the egg-trays which are carried on the shelves are denoted by 20. When a counter weight 16 strikes against right hand end of the rail 18, the shelf 12 is tipped over into slanting position as indicated, and the tray 20 then slides downward until it strikes against a table formed by rails 22. During the further travel of the conveyor the counter weight 16 is caused to slide over projections 24 on the rail 18 whereby the shelf 12 is rocked to and fro, which has the effect of jolting the tray so as to cause the lowermost edge of the tray to slide forwardly on the rail 22, so that the tray will be at a small angle to the shelf 12, as shown to the left in Fig. 1.

The foremost edge of each of the rails 22 is bent downwards to form a sloping ramp 26 down which the trays are adapted to slide. Flush with these ramps swingable members are arranged, which as shown consist of flaps 28 mounted on a rockable shaft 30. At its lowermost edge each flap 28 has a flange 32 extending approximately at right angles to the flap and forming a stop serving to arrest the tray at the bottom of the flap.

The shaft 30 is swung to and fro by means of a mechanism which is described later.

When a tray is positioned on a flap 28 the latter is given a forward swinging movement into the position shown in dotted lines in Fig. 1, at which position the tray is discharged and falls in inverted position on to a belt conveyor 34 running at right angles to the conveyor 10, 12. The direction of movement of the conveyor 34 is indicated by the arrow 36 (Fig. 2).

As the shaft 30 is given a series of regular rocking movements, the trays 20 will be deposited in inverted position on the conveyor 34 at equally spaced intervals and their transfer is so arranged that there is no risk of the trays striking adjacent objects, which might involve irregularities.

The mechanism for actuating the shaft 30 consists of a chain wheel 38 in mesh with one of the chains 10. On the shaft 40 of this chain wheel a gear wheel 42 is mounted meshing with a smaller gear wheel 44 on a rotatable shaft 46. A cam mechanism, consisting of two complementary cam discs 48 and 50, is fixed to the shaft 46. On a fixed shaft 52 a three-armed lever is swingably mounted, the ends of the two arms 54 and 56 being provided with rollers 58 and 60, running on the periphery of the cam discs 48 and 50, respectively. These discs are so shaped that the lever is positively swung to and fro during each rotation of the cam discs. The end of the third arm 62 of the lever carries a toothed segment 64 meshing with a toothed segment 66 fixed to the shaft 30. Accordingly the swinging movement of the lever mechanism effects a corresponding but larger angular movement of the shaft 30. The time taken to complete each swinging movement and the velocity at any point of the swinging movement depends on the shape of the cam discs 48 and 50.

In addition to the projections 24 the rail 18 has a larger projection 68 arranged in such a way that the shelves 12 in passing are tipped into a substantially perpendicular position. This ensures that the uppermost part of the sliding tray will clear the lowermost part of the shelf 12 as the tray slides onto the ramp 26.

The flaps 28 have curved extensions 70 extending to the rear for preventing the trays 20 accidentally slipping behind the flaps 28.

The embodiment of the invention shown in Fig. 3 differs from the previously described embodiment only in that the rails 22 and ramp 26 of Fig. 1 have been replaced respectively by an endless belt 72 and a slanting surface 86. This belt, which e.g. may be made of links of wire chained together, passes over guide rollers 74 and 76 and over a driving roller 78. The roller 78 is driven from the shaft 40 by a chain 84 engaging over chain wheels 80 and 82. The sizes of the chain wheels 80 and 82 are so designed that the belt 72 will move slightly faster than the conveyor 10, 12, thus causing the lowermost edge of the trays 20 within the range of the uppermost, horizontal run of the belt 72 to be lifted away from the shelves 12, with the same effect as is produced by the projections 24 described in connection with Fig. 1.

As the trays slide off the shelves 12, as shown at the left in Fig. 3 they slide over the slanting surface 86 to the flaps 28.

The belt 72 also serves to ensure that the trays 20 are correctly carried forward on to the surface 84 leading to the flaps 28 and ensures that they will not be hit by the lower part of the shelf and thereby be turned over unintentionally. Accordingly the projection 68 (Fig. 1) is not required in the apparatus as shown in Fig. 3.

While the invention has been described with reference to conveying egg trays it is not limited in this respect.

Having now fully described our invention we claim as new and desire to secure by Letters Patent:

1. In an apparatus for conveying articles of the kind which includes a first conveyor provided with swingable shelves for the articles to be conveyed and a second conveyor arranged at right angles to said first conveyor and on to which said articles are adapted to be transferred by swinging said shelves, a transfer member arranged between said two conveyors, said member comprising a sloping swingable support for receiving the articles from said shelves of the first conveyor and means for rocking said sloping support to discharge the articles on to said second conveyor.

2. Apparatus according to claim 1, in which said sloping support has at its lower edge an upturned flange for arresting the downward sliding of the articles along said support.

3. In an apparatus for conveying articles of the kind which includes a first conveyor provided with swingable shelves for the articles to be conveyed and a second conveyor arranged at right angles to said first conveyor and on to which said articles are adapted to be transferred by swinging the shelves, a transfer member arranged between said two conveyors, said member comprising a sloping support for receiving the articles from said shelves of the first conveyor and being connected to a shaft and means for swinging said shaft into a position in which the articles are discharged from said support on to said second conveyor, said means including a cam mechanism.

4. Apparatus according to claim 3, in which a driving mechanism is provided between said first conveyor and said cam mechanism.

5. Apparatus according to claim 3, in which said cam mechanism includes complementary cams for positively swinging said transfer member in both directions.

6. In an apparatus for conveying articles of the kind which includes a first conveyor provided with at least one row of swingable shelves for the articles to be conveyed, means for swinging said shelves to an inclined position, and a second conveyor arranged at right angles to said first conveyor and on to which said articles are to be transferred from the inclined shelves, a rail arranged beneath the discharge end of said first conveyor and adapted to form an abutment for the foremost edges of the articles when the shelves occupy said inclined position, a movable transfer member arranged between said two conveyors, said member forming in one position a sloping support for receiving the articles from said shelves at the discharge end of said first conveyor and means for swinging said member to a second position to discharge the articles on to said second conveyor.

7. In an apparatus for conveying articles of the kind which includes a first conveyor provided with at least one row of swingable shelves for the articles to be conveyed, means for swinging said shelves to an inclined position, and a second conveyor arranged at right angles to said first conveyor and on to which said articles are to be transferred from the inclined shelves, an endless belt arranged under the discharge end of said first conveyor, said belt being adapted to support the foremost edges of the articles when the shelves occupy said inclined position, a movable transfer member arranged between said two conveyors, said member forming in one position a sloping support for receiving the articles from said shelves at the discharge end of said first conveyor when said articles are leaving the belt and means for swinging said member into a second position to discharge the articles on to said second conveyor.

8. Apparatus according to claim 7, in which means are provided for driving said belt at a speed slightly higher than that of said first conveyor.

9. In an apparatus for conveying articles, including a first conveyor, swingable shelves arranged in at least one row on said conveyor, and means for tilting said shelves at the discharge end of said conveyor, the improvement comprising a transfer member swingably mounted on a horizontal axis perpendicular to said first conveyor at the discharge end thereof and being movable from a slanting position in which said member forms a chute for said articles to a position in which said articles are discharged, and a second conveyor arranged at right angles to said first conveyor in a position to receive said discharged articles.

10. Apparatus according to claim 9, in which said transfer member is formed as a flap pivotally supported and provided at its lower edge with an upstanding flange and having at its upper edge a rearwardly extending curved extension.

11. Apparatus according to claim 9, in which a table is arranged beneath said shelves at the discharge end of said first conveyor, said table serving to slidingly support said articles when said shelves have been tilted.

12. Apparatus according to claim 9, in which a travelling belt is arranged beneath said shelves at the discharge end of said first conveyor, said belt being adapted to support said articles when said shelves have been tilted, and means for driving said belt at a speed slightly exceeding that of said first conveyor.

References Cited in the file of this patent

UNITED STATES PATENTS

| | | |
|---|---|---|
| 1,648,330 | Smith | Nov. 8, 1927 |
| 1,903,835 | Olson | Apr. 18, 1933 |
| 2,342,393 | Feige | Feb. 22, 1944 |